United States Patent
Cherian et al.

(10) Patent No.: US 7,397,764 B2
(45) Date of Patent: Jul. 8, 2008

(54) FLOW CONTROL BETWEEN FIBER CHANNEL AND WIDE AREA NETWORKS

(75) Inventors: Babu Kalampukattussery Cherian, Bangalore (IN); William R. Krieg, Cary, NC (US); Shreedhara Maduvinakodi Ramegowda, Bangalore (IN); Hemant Kumar KashinathRao Revankar, Bangalore (IN); Andrew T. Schnable, Cary, NC (US); Shiva Kumar Yenigalla, Bangalore (IN)

(73) Assignee: Lucent Technologies Inc., Murray Hill, NJ (US)

( * ) Notice: Subject to any disclaimer, the term of this patent is extended or adjusted under 35 U.S.C. 154(b) by 1007 days.

(21) Appl. No.: 10/426,819

(22) Filed: Apr. 30, 2003

(65) Prior Publication Data

US 2004/0218531 A1  Nov. 4, 2004

(51) Int. Cl.
*G01R 31/08* (2006.01)

(52) U.S. Cl. .................. 370/235; 370/466; 370/401

(58) Field of Classification Search ......... 370/229–238, 370/400–401, 466, 465
See application file for complete search history.

(56) References Cited

U.S. PATENT DOCUMENTS

| | | | |
|---|---|---|---|
| 7,116,671 B2 * | 10/2006 | Williams | 370/395.21 |
| 7,165,258 B1 * | 1/2007 | Kuik et al. | 719/326 |
| 2002/0156924 A1 * | 10/2002 | Czeiger et al. | 709/249 |
| 2003/0061269 A1 * | 3/2003 | Hathaway et al. | 709/202 |
| 2003/0115355 A1 * | 6/2003 | Cometto et al. | 709/234 |
| 2003/0185154 A1 * | 10/2003 | Mullendore et al. | 370/230 |
| 2003/0198184 A1 * | 10/2003 | Huang et al. | 370/231 |
| 2004/0085904 A1 * | 5/2004 | Bordogna et al. | 370/236 |

* cited by examiner

*Primary Examiner*—Ricky Ngo
*Assistant Examiner*—Kibrom T Hailu

(57) ABSTRACT

Multiple fiber channel (FC) storage area networks (SANs) are interconnected over wide-area networks (WANs) to form a long-distance (e.g., greater than about 10 km) distributed storage area network (DSAN) that includes FC to Internet Protocol (IP) over WAN (e.g., SONET or gigabit Ethernet (GE)) gateways that interwork the FC buffer-to-buffer and IP/WAN flow-control mechanisms appropriate to either the SONET or GE link layers using an additive increase, multiplicative decrease (AIMD) congestion avoidance algorithm. The gateways effectively spoof the FC buffer-to-buffer credit mechanism on the FC-interface side of the gateway, while using an IP Internet control message protocol (ICMP) quench mechanism on all WAN links and additionally the IEEE 802.3 pause packet flow control mechanism on gigabit Ethernet (GE) WAN links in combination, in both cases, with a rate-throttling mechanism at the FC<->IP converter.

18 Claims, 4 Drawing Sheets

FLOW CONTROL BETWEEN FIBER CHANNEL AND WIDE AREA NETWORKS

BACKGROUND OF THE INVENTION

1. Field of the Invention

The present invention relates to storage area networks and, more specifically, to distribution of storage elements across a wide area network.

2. Description of the Related Art

Recently, the growth in demand for networked storage has exploded. Enterprise applications such as data warehousing, email, and remote backup create hundreds of terabytes of data per day. Storage Area Networks (SANs) and Network Attached Storage (NAS) have become the de-facto technologies for storing, organizing, and distributing the massive amount of data being generated by these applications.

Until recently, storage area networks (SANs) were typically limited to a single site or to operations over a short distance or over low-bandwidth bridges. As the demand for networked storage continues to grow, so does the demand for connecting these "localized islands" of storage over local-area networks (LANs), metropolitan-area networks (MANs), and wide-area networks (WANs).

Traditionally, the need to connect SANs over long distances was driven by applications such as archiving and disaster recovery. Additionally, new time-sensitive applications such as remote web mirroring for real-time transactions, data replication, and streaming services are increasing the demand for high-performance SAN extension solutions.

Connecting SANs over short distances is a relatively straightforward task. Fiber channel (FC), the dominant protocol for SAN connectivity, provides the ability to connect SANs at distances up to 10 km.

An in-development alternative to FC is iSCSI. iSCSI (internet small computer systems interface), a new IP-based storage protocol that will be used in Ethernet-based SANs, is essentially SCSI over transmission control protocol (TCP) over Internet protocol (IP).

The fiber channel family of standards (developed by the American National Standards Institute (ANSI)) defines a high-speed communications interface for the transfer of large amounts of data between a variety of hardware systems such as personal computers, workstations, mainframes, supercomputers, and storage devices that have FC interfaces. Use of FC is proliferating in client/server applications that demand high-bandwidth and low-latency I/O such as mass storage, medical and scientific imaging, multimedia communication, transaction processing, distributed computing, and distributed database processing. More information about fiber channel can be obtained from the National Committee on Information Technology Standards (NCITS) T11 standards organization that regulates FC standards, specifically "Fiber Channel—Physical and Signaling Interface, FC-PH," draft proposed standard, ver. 4.3, ANSI, 1994 (herein "the FC-PH standard"), incorporated herein by reference in its entirety.

Regardless of the technology (FC or iSCSI), performance is affected by many factors such as the distance between the data centers, the transport protocols (e.g., synchronous optical network (SONET), asynchronous transfer mode (ATM), and IP) and the reliability of the transport medium.

Many techniques have been developed to transport FC data through existing data and telecommunications networks. Boxes and systems are beginning to emerge that provide basic extensions of the physical links of FC. These basic-extension systems "stretch" the wire but often don't address system-level issues of FC performance (e.g., end-to-end flow control). Existing extension gateways can tunnel FC data over other transport protocols but only between a few sites. Fiber channel provides an inherently reliable method of transporting data. SCSI (which may ride on FC) presumes that data is delivered in order and reliably. To carry FC outside a data center, an extension system should maintain the same levels of performance and reliability regardless of the distances involved. Efforts focusing on solutions to FC long distance transport are documented by IETF draft standards in the areas of FC-over-IP (FCIP), specifically Rajgopal, M., "Fibre Channel Over TCP/IP (FCIP)", Internet Draft, IPS Working Group, IETF, version 12, Aug. 2002 (herein "the FCIP draft proposal"), incorporated herein by reference in its entirety.

By its nature, IP is unreliable. Mechanisms exist to signal congestion conditions in IP networks but they are generally associated with the dropping of packets. One such mechanism is the ICMP quench message discussed in Postel, J., "Internet Control Message Protocol (ICMP)," Network Working Group, RFC 792, IETF, Sep. '81 (herein "RFC 792"), incorporated herein by reference in its entirety. Layering transmission control protocol (TCP) over IP corrects for errors in packet ordering and packet loss but does so with the insertion of considerable delay and with reduced bandwidth associated with the retransmission and window control mechanisms used in TCP. These mechanisms and their impact on performance for large data transfers over long distances are discussed in more detail in Semke, M., Mahdava, and Ott, "The Macroscopic Behavior of the TCP Congestion Avoidance Algorithm," Computer Communication Review, a publication of the ACM SIGCOMM, vol. 27, number 3, 1997 (herein "Semke '97"), incorporated herein by reference in its entirety.

As enterprise storage needs continue to grow, solutions are needed that can extend the reliable, high-performance characteristics of FC to SAN fabrics of thousands of kilometers, thereby unifying enterprise SAN islands into large geographically dispersed SAN systems.

SUMMARY OF THE INVENTION

Problems in the prior art are addressed in accordance with principles of the invention by a method and apparatus for interconnecting multiple fiber channel (FC) storage area networks (SANs) over wide-area networks (WANs) to form a long-distance (e.g., greater than 10 km) distributed storage-area-network (DSAN) supported by a high-performance distributed FC fabric. Within the DSAN, remote FC fabric islands are interfaced to WANs, e.g., synchronous optical network (SONET) and/or gigabit Ethernet (GE), via FC to Internet Protocol (IP) over SONET (FC-IP/SONET) or FC to IP over GE (FC-IP/GE) gateways, respectively. The gateways interwork the FC buffer-to-buffer and IP flow-control mechanisms appropriate to either the SONET or GE link layers and employ an additive increase, multiplicative decrease (AIMD) rate-adjustment algorithm for congestion avoidance.

In one embodiment, each gateway effectively "spoofs" the FC buffer-to-buffer credit mechanism on the FC-interface side of the gateway while using both IP Internet control message protocol (ICMP) quench messages on all WAN links and additionally the IEEE 802.3 "pause packets" flow-control mechanism on gigabit Ethernet WAN links in combination in both cases with a rate-throttling mechanism at the FC-over-IP encapsulator/deencapsulator.

In another embodiment, the present invention is a gateway for coupling a fiber channel (FC) network and a wide area network (WAN). The gateway includes an FC interface adapted to interface with the FC network, a WAN interface adapted to interface with the WAN, and a processor adapted to convert FC data received by the FC interface into internet protocol (IP) over WAN (IP/WAN) data for transmission by the WAN interface to the WAN. In this embodiment, when the WAN interface receives WAN congestion information from the WAN, the gateway uses the WAN congestion information to control the rate of transmission of data from the FC network to the WAN.

In another embodiment, the present invention is a distributed storage area network (DSAN) that includes: a first FC device, a first gateway coupling the first FC device to a WAN, a second FC device, and a second gateway coupling the second FC device to the WAN. In this embodiment, at least one gateway is adapted to interwork flow control between its corresponding FC device and the WAN.

In yet another embodiment, the present invention is method for coupling an FC network and a WAN. The method involves: (1) receiving FC data from the FC network, (2) transmitting, to the WAN, IP/WAN data corresponding to the FC data, (3) receiving WAN congestion information from the WAN, (3) and controlling the rate of transmission of data from the FC network to the WAN.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Distributed Storage Area Network

Figure 1:
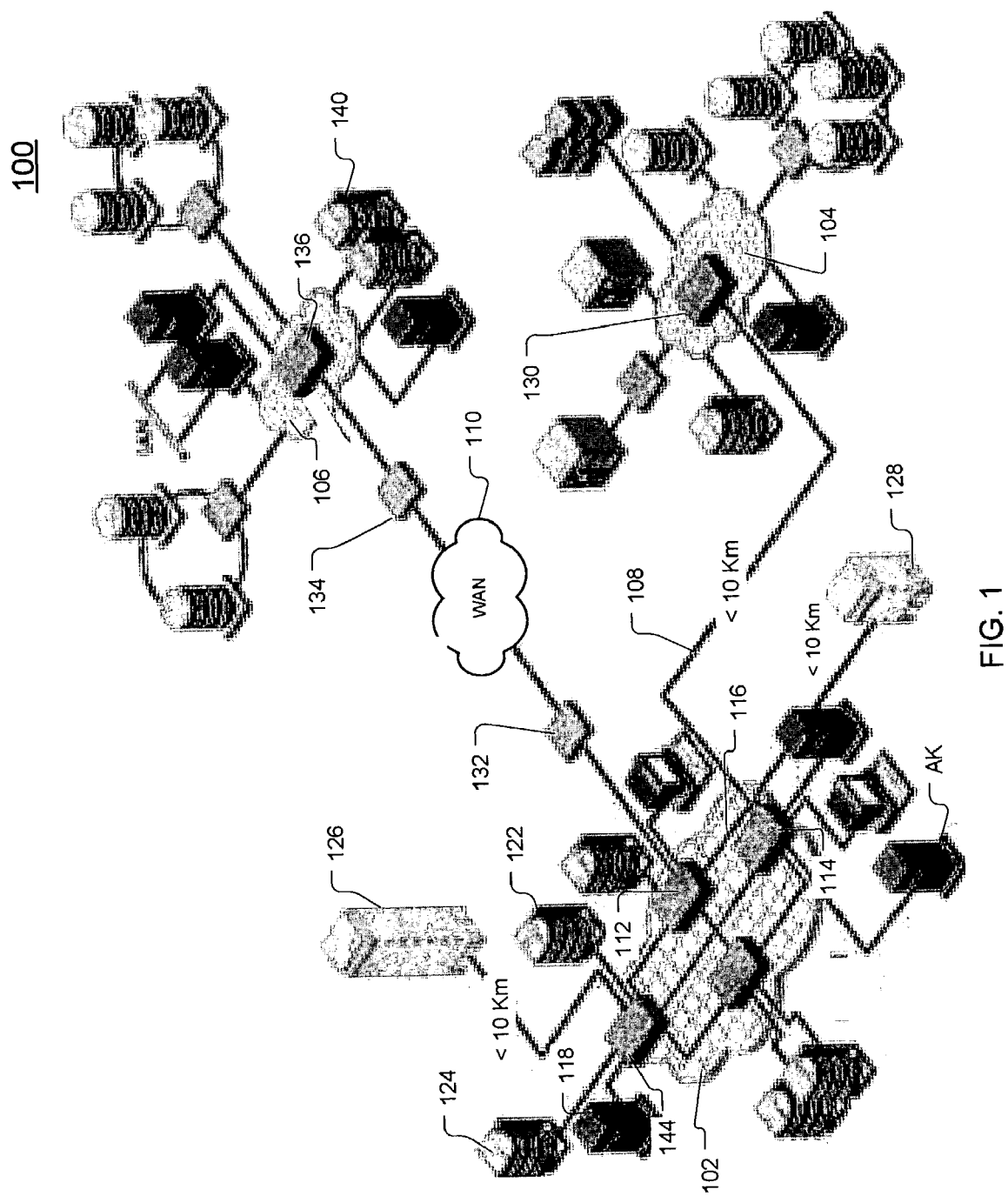
FIG. 1 is an illustration of a distributed storage area network (DSAN) according to one embodiment of this invention.

FIG. 1 depicts wide-area distributed storage area network (DSAN) 100 according to one embodiment of the present invention. FIG. 1 shows fiber channel (FC) switching-fabric islands 102 and 104 coupled to each other via FC link 108 and further coupled to FC switching-fabric island 106 via WAN (e.g., synchronous optical network (SONET) or gigabit Ethernet (GE)) cloud 110.

By definition, a switching fabric includes at least two FC switches interconnected via an FC interface cable. A switching fabric island is a cluster of FC switches physically or logically separated in some fashion from another cluster of FC switches. Thus, each of switching fabric islands 102, 104, and 106 is both a switching fabric and a switching fabric island. Moreover, switching fabric islands 102 and 104 may be considered to form a single switching fabric because they are connected by an FC interface cable (i.e., FC link 108).

Thus, for example, switching fabric island 102 includes FC switches 112 and 114 interconnected via FC interface cable 116. On the other hand, although they are part of different switching fabric islands, FC switches 114 and 130 may be considered part of the same switching fabric, because they are connected by FC link 108. In this discussion, the term "FC network" will be understood to include one or more FC devices, where an FC device could be an FC switch or an FC peripheral.

The function of an FC switching fabric is to interconnect various data devices to facilitate high-speed data transfer between them. FIG. 1 depicts various devices interconnected by the switching fabrics. For example, switching fabric 102 interconnects hosts 118 and 120, storage devices 122 and 124 (e.g., disk arrays, RAIDs, and tape drives), and enterprises 126 and 128 (which themselves may consist of a variety of hosts, FC switches, disk arrays, etc).

Note that FC links are generally limited (per the FC-PH standard) to a length of about 10 km. However, it is of interest (see, for example, the FCIP proposed standard) to extend switching fabrics over greater distances by allowing FC data to be carried on long-haul and wide-area networks such as SONET and GE. A long-haul extension according to the present invention is illustrated by the combination of FC switches 112 and 136, FC to IP/WAN (FC-IP/WAN) gateways 132 and 134, and WAN 110.

Here, for example, an FC transmission from host 118 to storage element 140 will first be channeled to FC switch 144, where it will be switched to FC switch 112, where it will be switched to FC-IP/WAN gateway 132. In FC-IP/WAN gateway 132, the FC data will be convertd (e.g., encapsulated) into IP, packed into WAN (e.g., SONET or GE) frames, and sent over WAN 110 to FC-IP/WAN gateway 134. In gateway 134, the IP data is reassembled from the WAN frames, and then FC data is again converted (e.g., deencapsulated) from the IP frames and sent using FC protocol to FC switch 136. From there, the data is switched to storage device 140.

At a high level, in the event of congestion on the far side (e.g., within switch fabric island 106) of the long-haul extension, destination gateway 134 will issue ICMP quench messages (per RFC 792) to source gateway 132, which will in response withhold buffer credits (according to FC buffer-to-buffer flow control practice per the FC-PH standard) from FC switch 112. In response, FC switch 112 will withhold buffer credits from FC switch 144, which will withhold buffer credits from the FC host bus adapter (HBA) within host 118, thereby throttling the source of the transmission via the FC HBA in host 118.

Similarly, for example, if a host associated with the far-side switch fabric island 106 were to generate traffic for a storage device (e.g., 122) connected to the near-side switch fabric island 102, this traffic would first be channeled to FC switch 136, where it would be switched to FC-IP/WAN gateway 134. In FC-IP/WAN gateway 134, the FC data will be converted to IP, packed into WAN (e.g., SONET or GE) frames, and sent over WAN 110 to FC-IP/WAN gateway 132. In gateway 132, the IP data is reassembled from the WAN frames, and then FC data is converted from the IP frames and sent using FC to FC switch 112. From there, the data is switched through switch fabric island 102 to storage device 122.

As before, if congestion were encountered on the destination side, gateway 132 would issue ICMP quench messages (per RFC 792) to source gateway 134, which will in response withhold buffer credits (according to FC buffer-to-buffer flow control practice per the FC-PH standard) from FC switch 136. In response, FC switch 136 will withhold buffer credits from the FC HBA within the source host associated with switching fabric 106, thereby throttling the source of the transmission.

Alternatively or additionally, when congestion is encountered on the FC destination side of a transmission and the WAN is GE, the FC-IP/WAN gateway will issue both ICMP quench messages and 802.3x pause packets (according to IEEE 802.3x "Full Duplex Operation," IEEE standard 802.3, 1997 edition, herein "IEEE 802.3," incorporated herein by reference in its entirety).

Note that, in contrast to the FCIP proposed standard, in gateways according to certain implementations of the present invention, FC is encapsulated directly into IP frames at the network layer instead of being encapsulated into TCP packets at the transport layer. Furthermore, flow control between FC and WAN interfaces is explicitly addressed by interworking FC buffer-to-buffer management and ICMP quench (and, in the case of GE, additionally pause packet) flow-control mechanisms in such a way that the network is generally managed at a low packet-loss, high effective-throughput steady-state.

Enhanced FC-IP/WAN Gateway

Figure 2:
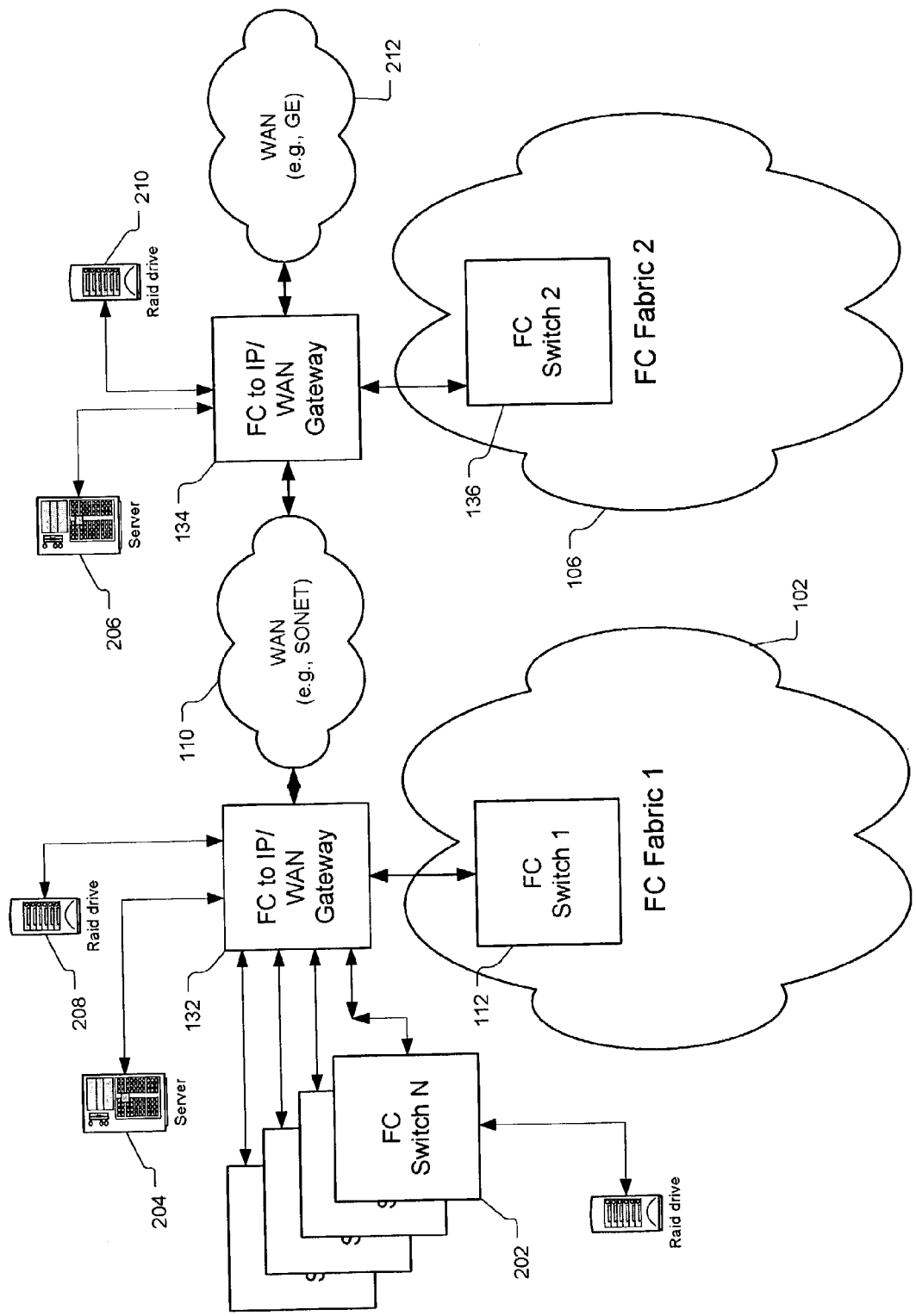
FIG. 2 is an illustration of elements 132, 110, 134, 112, 102, 136, and 106 of FIG. 1.

FIG. 2 is a simplified drawing illustrating the elements of FIG. 1 involved in the long-haul extension as well as some of the additional functions and interfaces that are supported in one or more of the implementations of the FC-IP/WAN gateways of the distributed storage area network of this invention. For example, in addition to the single FC interface illustrated in FIG. 1 for gateways 132 and 134, FIG. 2 shows these gateways as "enhanced" gateways supporting interfaces to multiple FC switches 202, multiple servers 204 and 206, multiple storage devices 208 and 210, and multiple WAN interfaces per gateway of either the SONET (e.g., 110) or GE (e.g., 212) variety or both. Note that in some embodiments the gateways incorporate the functionality of FC switches, FC switch fabrics, and WAN switch fabrics. In addition, in certain implementations, hosts may be directly connected to the gateways of the present invention either by using direct FC interfaces or by incorporating host bus adapters directly into the gateway and then using IEEE 1394, SCSI, or USB interfaces between the host and the gateway.

Basic FC-IP/WAN Gateway Function

Figure 3:
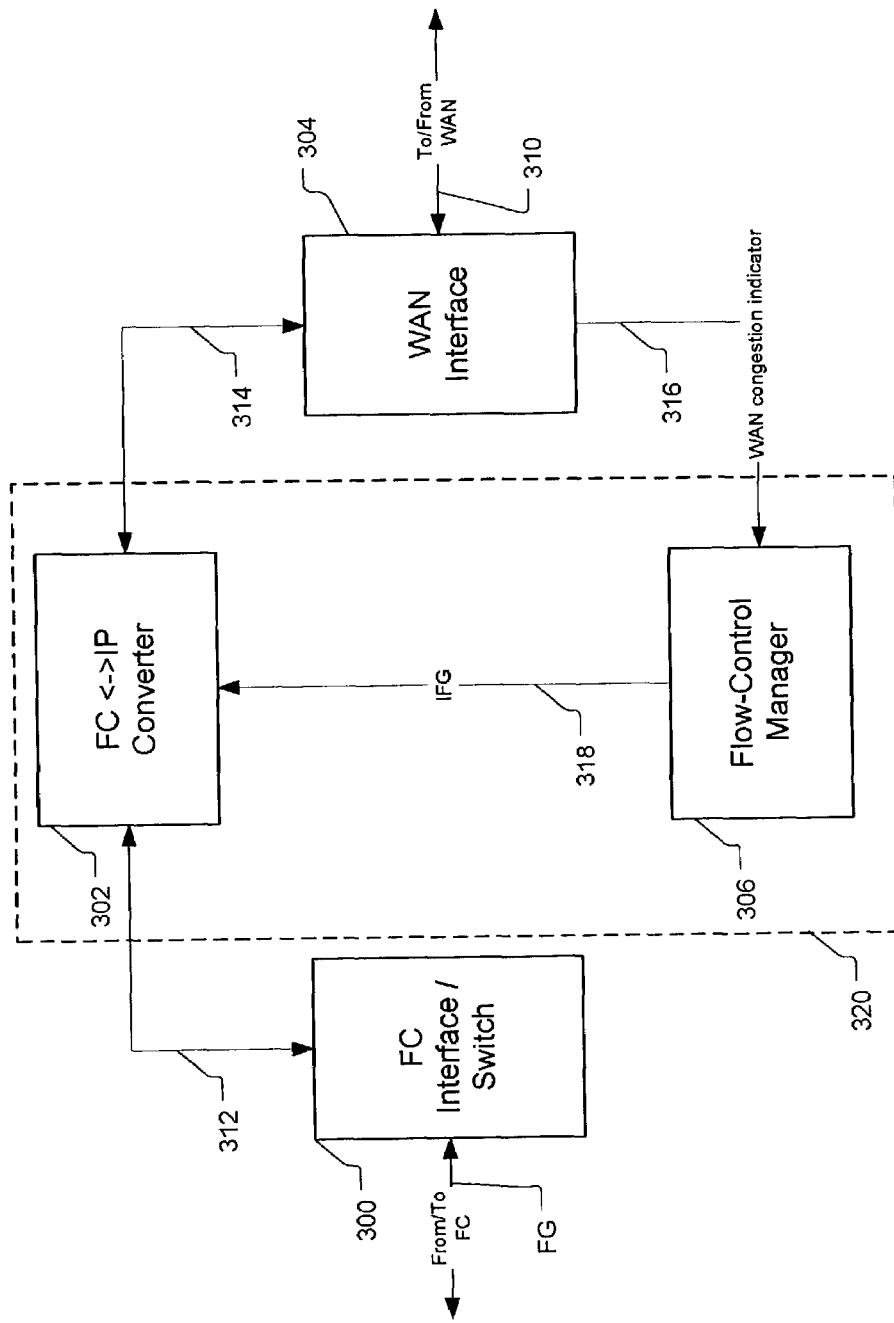
FIG. 3 is an illustration of those elements of an FC-IP/WAN gateway (e.g., 132 of FIG. 1) that are specifically involved in the FC-IP/WAN interface function.

FIG. 3 shows those elements of an FC-IP/WAN gateway (e.g., 132 of FIG. 1) that are specifically involved in the FC-to-IP/WAN interface function. Other elements, for example, supporting the "enhanced" gateway functions depicted in FIG. 2, are not explicitly illustrated in FIG. 3.

As illustrated, the FC-IP/WAN gateway includes FC interface/switch 300, processor 320, and WAN Interface 304. Processor 320 comprises FC<->IP converter 302, and flow-control manager 306.

FC-to-WAN Traffic

Paralleling the relevant portion of the examples provided earlier with respect to FIG. 1, consider the case of FC traffic into FC I/O port 308 of gateway 132 that is ultimately bound for a device on the far side of a WAN that is connected to WAN I/O port 310 of gateway 132. Assuming first that there is no congestion on the WAN side of the network, FC data will flow into FC interface/switch 300 through I/O port 308 and travel via internal bus 312 to FC<->IP converter 302, where FC frames are converted (e.g., encapsulated) into IP frames. The IP frames will flow via internal bus 314 to WAN interface 304, where IP frames are converted into WAN (e.g., SONET or GE) frames and sent out to the WAN via WAN I/O port 310. On the input side (308), encountering no backup in input buffers in FC<->IP converter 302, FC interface switch 300 will continue to issue buffer credits (per the FC-PH standard) upstream to external FC switches, thereby allowing FC traffic to continue to flow. In the event of congestion on the WAN side of gateway 132 at a gateway downstream of gateway 132, the downstream gateway will begin to issue ICMP quench messages upstream in the direction of gateway 132 at the IP (i.e., network) layer. Additionally, if the WAN is GE, the downstream gateway will begin to issue pause packets (per IEEE 802.3) upstream in the direction of gateway 132 at the GE link layer.

In response to these ICMP quench messages (and pause packets if the WAN is GE), WAN interface 304 will issue a WAN congestion indicator over control interface 316 to flow-control manager 306. In response, the flow-control manager will update an interframe-gap (IFG) parameter in FC<->IP converter 302. This IFG parameter is used by the converter to adjust the interval between packets that it converts and sends to the WAN interface over interface 314.

WAN-to-FC Traffic

Similarly, for traffic in the opposite direction (i.e., from WAN port 310 to FC port 308), assuming first that there is no congestion on the FC side of the network, FC-over-IP/WAN data will flow into WAN interface 304 through I/O port 310. In the WAN interface, IP packets are reassembled from WAN (e.g., SONET or GE) frames and sent via internal bus 314 to FC<->IP converter 302, where FC frames are converted (e.g., deencapsulated) from IP frames. The FC frames flow via internal bus 312 to FC interface/switch 300, where FC data is sent out to the FC fabric via I/O port 308. On the input side (310), encountering no backup in input buffers in FC<->IP converter 302, the WAN interface will pass data without restriction or throttling to the converter, thereby allowing IP/WAN traffic to continue to flow into port 310.

In the event of congestion on the FC side of gateway 132 at an FC switch or FC peripheral downstream of gateway 132, the congested FC device will begin to withhold buffer credits upstream in the direction of gateway 132. The lack of buffer credits on a particular channel will begin to create a backup in the corresponding queue for that channel in FC interface/switch 300. This full or near full buffer condition will be communicated back to converter 302 and in turn to WAN Interface 304. The WAN interface, thus sensing the downstream congestion on the FC side of the gateway, will begin to issue ICMP quench messages upstream in the direction of the source of the WAN data. Additionally, if the WAN is GE, the WAN interface will also issue pause packets at the GE link layer (per IEEE 802.3) upstream in the direction of the source WAN gateway. Note that, in this embodiment, for WAN-to-FC data flow, flow-control manager 306 plays no specific role in congestion avoidance. Instead, the full buffer conditions on each channel are allowed to propagate in the opposite direction of the data flow, and the interpreted congestion is signaled upstream toward the source with the standard mechanisms of ICMP quench (and pause packets in those cases where the WAN is GE).

Flow-Control Manager

Referring back to the discussion of traffic flowing from FC to WAN sides of the gateway, as was stated, in response to ICMP quench messages (and pause packets if the WAN is GE), the WAN interface will issue a WAN congestion indicator over control interface 316 to flow-control manager 306. As noted, in response to this indicator, the flow-control manager will update an interframe-gap (IFG) parameter in FC<->IP converter 302 via control interface 318. This IFG parameter is used by the converter to adjust the interval between packet conversions. By varying the interval between packet conversions (and thereby subsequent transmission to WAN interface 304), the converter effectively varies the packet rate to the WAN interface. As packet rate is throttled in the converter, buffers within gateway 132 may begin to fill. In the event the buffers reach a full or near full threshold, FC interface switch 300 begins to withhold buffer credits from the external FC switches, effectively spoofing the FC flow-control mechanism.

The goal of the flow-control manager is to avoid congestion on the WAN interface by regulating the packet rate. To do this, it controls packet rate according to an additive increase, multiplicative decrease (AIMD) algorithm. The theoretical basis for convergence and operation of this algorithm was established in Chiu, D. M., Jain, R., "Analysis of the Increase and Decrease Algorithms for Congestion Avoidance in Computer Networks," Computer Networks and ISDN Systems 17, Elsevier Science Publishers, B. V. North-Holland, 1989 (herein "Chiu '89") incorporated herein by reference in its entirety.

Fundamentally, the flow-control manager operates by starting the packet rate at zero and stepping the rate up (by an additive increment) every T units of time until congestion is encountered or the maximum packet rate is reached. Once congestion is encountered, the packet rate is "backed off" (by a multiplicative factor) until congestion is no longer seen or until the packet rate is zero. In this way, the rate typically oscillates about an ideal throughput rate for the network where throughput is maximized, and congestion and related latencies are limited.

Figure 4:
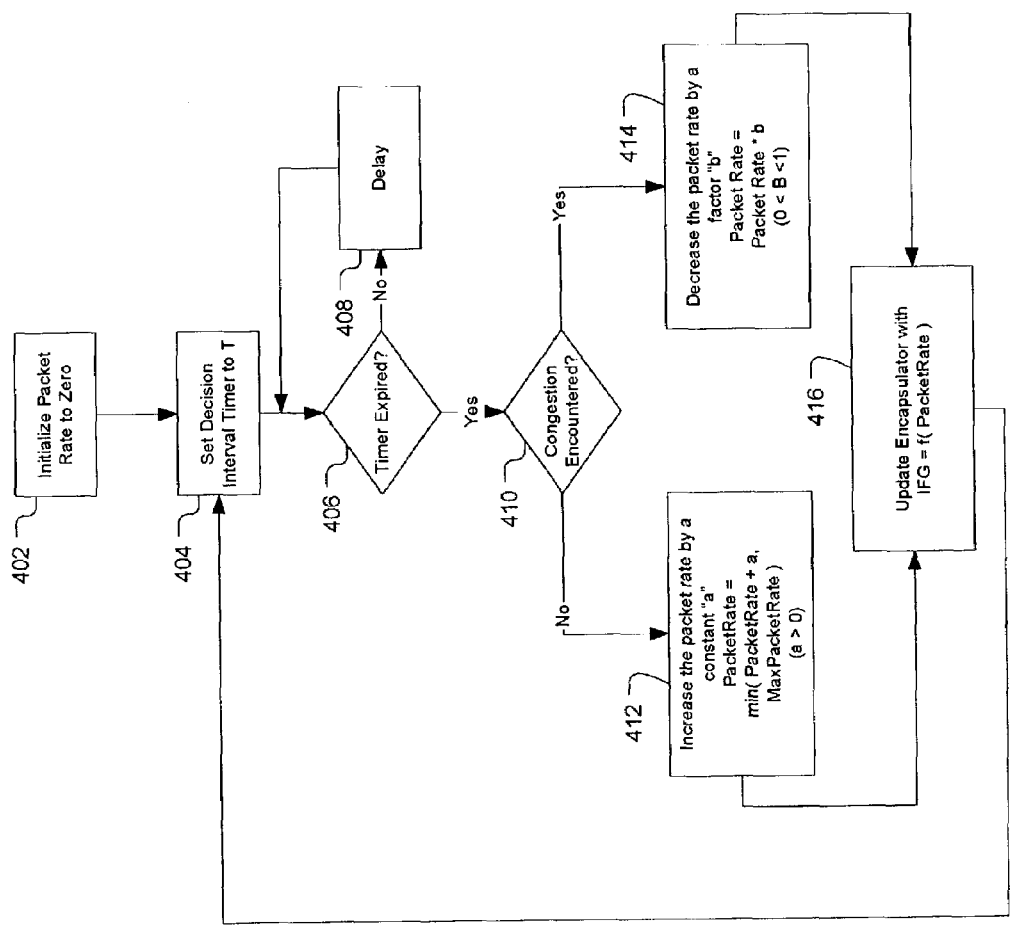
FIG. 4 is a flow diagram of an exemplary implementation of flow-control manager 306 of FIG. 3.

FIG. 4 is a flow diagram of an exemplary implementation of flow-control manager 306 of FIG. 3. As illustrated, in step 402, the packet rate is initialized to zero, and, in step 404, a decision interval timer is initialized to T time units. In step 406, if the timer has not expired, then a delay (e.g., T/100) is executed in step 408, and the test of step 406 is repeated. Steps 406 and 408 are repeated until the timer expires, at which point, test 410 is executed to see if congestion has been encountered (as indicated to the flow-control manager by the WAN interface via interface 316). If no congestion was encountered, then, in step 412, the packet rate is additively incremented (limited to a maximum of MaxPacketRate) according to the equation in block 412. If congestion was encountered, then, in step 414, the packet rate is multiplicatively decremented (limited to a minimum of 0) according to the equation in block 414. In either case, in step 416, the IFG parameter is calculated as a function of the new packet rate and then passed to the FC<->IP converter for use in data throttling. Control then flows back to step 404 where the decision timer is reset to T.

IFG Calculation Method

The interframe gap (IFG) is the delay interval that will be inserted between packet transmissions in the FC<->IP converter.

Note that IFG is related to the inverse of the packet rate as follows:

$$\text{PacketTime} + IFG = \text{MaxPacketRate} / \text{PacketRate} * \text{PacketTime} \quad (1)$$

where PacketTime is the duration of each packet given the line rate of the WAN interface. For example, if the WAN is GE, and the packet length is 1000 bits, then the line rate is nominally 1 Gbps, the MaxPacketRate is 1 Gbps/1000 bits per packet=1 million packets per second, and the PacketTime is 1 uS.

Solving equation (1) for IFG yields:

$$IFG = \text{PacketTime} (\text{MaxPacketRate}/\text{PacketRate} - 1) \quad (2)$$

Note that as PacketRate approaches MaxPacketRate, IFG approaches zero, and, as PacketRate approaches zero, IFG gets very large. According to the multiplicative decrease portion of the AIMD algorithm, once incremented beyond its initialization value of zero, PacketRate would never again actually reach zero mathematically. However, in practical implementations, its quantized value will truncate to zero and equation (2) will become undefined. This special case is handled by the flow-control manager sending a special value to the FC<->IP converter under these circumstances. This special value is effectively interpreted by the FC<->IP converter as "Stop Transmission."

In practical implementations, to avoid multiplications, divisions, or even additions in real-time, the calculation of IFG is done off-line and the results (including a special coded value associated with PacketRate=0) are quantized into a table that is preloaded into the memory of the real-time hardware. During operation, the IFG values are looked up in real time in the memory and passed to the FC<->IP converter. A different table is prepared for each MaxPacketRate and each different packet size supported by the gateway corresponding to the WAN interfaces supported (e.g., GE, SONET OC-3, SONET OC-12) and the IP packet size selection, respectively. The additive increment of step 412 and multiplicative decrement of step 414 of FIG. 4 likewise can be replaced with corresponding pointer calculations. The results of these calculations is a pointer that is used to reference into the pre-calculated IFG table to allow the flow-control manager to fetch the proper IFG value to send to the FC<->IP converter corresponding to a given desired PacketRate.

As would be understood to one skilled in the art, the parameters that control the AIMD algorithm, namely, the additive increment value "a", the multiplicative decrement "b", and the decision interval T, are programmable values provided to an offline manager or host to use in the calculation of the IFG table. This host could be local to the gateway or remote with networked communication to the gateway via, for example, simple network management protocol (SNMP).

Many alternative implementations of the IFG calculation are possible, as would be understood to one skilled in the art, including non-linear scaling of the IFG values to determine how quickly the IP packet rate is "backed-off" when congestion is encountered.

Additionally, alternative implementations based on passing desired line rate or packet rate directly from the flow-control manager to the FC<->IP converter instead of first converting to an interframe-gap parameter are also within the spirit of this invention. Finally, alternative implementations where the flow control is partitioned differently between elements of the gateway are also possible within the scope and principle of the present invention.

Pause Packets

Certain embodiments of the flow-control manager that support GE on the WAN interface will also consider IEEE 802.3 pause packets during the IFG calculation. When a pause packet is received from the link layer of the WAN interface, it is used as an override on the IFG calculation that was based on ICMP quench messages alone. When there are no pause packets received from the WAN interface, IFG is calculated according to the equation (2) as before. However, when a pause packet is received in a particular decision interval, a "Stop Transmission" message is sent from the flow-control manager to the FC<->IP converter. Alternatively, pause packets can be used to slow the rate of transmission instead of stopping the transmission entirely. Various implementations of such an embodiment are possible including the use of various scales and alternative tables in memory that the flow-control manager may access to determine an IFG parameter to send to the FC<->IP converter.

Monitoring and Dynamic Control

Values for parameters "a", "b," and "T" that are optimal for one gateway configuration and/or one set of network conditions might not be optimal for all configurations or conditions. Thus, these parameters are typically tuned adaptively to the configuration and network conditions by an off-line manager. The offline manager monitors the performance of the network and the gateway as well as the configuration of the gateway (e.g., number of WAN cards, rates on those WAN cards, and packet size per interface) and allows dynamic adjustment of the AIMD algorithm parameters within ranges established by a network manager.

Note that, in general, an FC-IP/WAN gateway of the present invention will be managing multiple streams and channels of data in multiple directions over multiple ports over multiple interfaces. To avoid complicating the discussion, this multiplicity of channels/ports/interfaces, congestion indicators, and IFG parameters was not explicitly illustrated or discussed. However, extension of the interworking functions and concepts of the prior discussion to multiple channels/ports/interfaces would be understood by one skilled in the art and is within the scope and principles of the present invention.

Additionally, although WAN congestion information was described with respect to ICMP quench messages associated with IP and 802.3 pause frames associated with GE, respectively, generally WAN congestion information should be understood to include other methods and indicators of flow control and traffic congestion that are appropriate to different wide area networks as would be understood to one skilled in the art. Similarly, FC congestion information includes buffer credits and other mechanisms that might be employed to communicate congestion information related to an FC network.

Though FIG. 2 depicts a specific structure for a gateway of the present invention, other structures are possible within the scope of this invention. The processor 320 of FIG. 3 may be implemented in many different ways including software, programmable logic or ASIC as would be understood to one skilled in the art.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A gateway for coupling a fiber channel (FC) network and a wide area network (WAN), comprising:
   an FC interface adapted to interface with the FC network;
   a WAN interface adapted to interface with the WAN;
   a converter adapted to (1) convert FC data received by the FC interface into internet protocol (IP) over WAN (IP/WAN) data for transmission by the WAN interface to the WAN and (2) convert IP/WAN data received by the WAN interface into FC data for transmission by the FC interface to the FC network; and
   a flow-control manager adapted to control the rate at which the converter converts FC data into IP/WAN data, wherein:
   if a backup is created in a queue of outgoing FC data in the FC interface as a result of the FC network withholding buffer credits for the FC interface, then (i) the FC interface communicates corresponding congestion information to the WAN interface, which causes (ii) the WAN interface to transmit WAN congestion information to the WAN to instruct the WAN to decrease the rate at which the WAN transmits IP/WAN data to the WAN interface; and
   if the WAN interface receives WAN congestion information from the WAN, then (i) the WAN interface communicates corresponding congestion information to the flow-control manager, which causes (ii) the converter to decrease the rate at which the converter converts FC data into IP/WAN data, which can create a backup in a queue of incoming FC data in the FC interface, in which case the FC interface will begin to withhold buffer credits for the FC network to decrease the rate at which the FC network transmits FC data to the FC interface.

2. The invention of claim 1, wherein the WAN congestion information comprises quench messages.

3. The invention of claim 2, wherein the WAN congestion information further comprises pause packets.

4. The invention of claim 1, wherein the FC interface communicates the corresponding congestion information to the WAN interface via the converter.

5. The invention of claim 1, wherein the FC interface does not communicate any congestion information to the flow-control manager.

6. The invention of claim 1, wherein the flow-control manager does not communicate directly with the FC interface regarding the withholding of buffer credits for the FC network.

7. The invention of claim 1, wherein the flow control manager does not control the rate at which the converter converts IP/WAN data into FC data.

8. The invention of claim 1, wherein the flow control manager decreases the rate at which the converter converts FC data into IP/WAN data based on a multiplicative factor.

9. The invention of claim 1, wherein the flow control manager decreases the rate at which the converter converts FC data into IP/WAN data by increasing a parameter corresponding to a time interval between IP/WAN data packet conversions.

10. The invention of claim 1, wherein:
    the WAN congestion information comprises at least one of quench messages and pause packets;
    the FC interface does not communicate any congestion information to the flow-control manager;
    the flow-control manager does not communicate directly with the FC interface regarding the withholding of buffer credits for the FC network;
    the flow control manager does not control the rate at which the converter converts IP/WAN data into FC data;
    the flow control manager decreases the rate at which the converter converts FC data into IP/WAN data based on a multiplicative factor;
    the flow control manager decreases the rate at which the converter converts FC data into IP/WAN data by increasing a parameter corresponding to a time interval between IP/WAN data packet conversions; and
    the FC interface communicates the corresponding congestion information to the WAN interface via the converter.

11. A system comprising:
a fiber channel (FC) network;
a wide area network (WAN); and
a gateway for coupling the FC network and the WAN, the gateway comprising:
   an FC interface adapted to interface with the FC network;
   a WAN interface adapted to interface with the WAN;
   a converter adapted to (1) convert FC data received by the FC interface into internet protocol (IP) over WAN (IP/WAN) data for transmission by the WAN interface to the WAN and (2) convert IP/WAN data received by the WAN interface into FC data for transmission by the FC interface to the FC network; and
   a flow-control manager adapted to control the rate at which the converter converts FC data into IP/WAN data, wherein:
      if a backup is created in a queue of outgoing FC data in the FC interface as a result of the FC network withholding buffer credits for the FC interface, then (i) the FC interface communicates corresponding congestion information to the WAN interface, which causes (ii) the WAN interface to transmit WAN congestion information to the WAN to instruct the WAN to decrease the rate at which the WAN transmits IP/WAN data to the WAN interface; and
      if the WAN interface receives WAN congestion information from the WAN, then (i) the WAN interface communicates corresponding congestion information to the flow-control manager, which causes (ii) the converter to decrease the rate at which the converter converts FC data into IP/WAN data, which can create a backup in a queue of incoming FC data in the FC interface, in which case the FC interface will begin to withhold buffer credits for the FC network to decrease the rate at which the FC network transmits FC data to the FC interface.

12. The invention of claim 11, wherein the system is a distributed storage area network (DSAN) comprising one or more storage devices that are part of the FC network and one or more storage devices that are part of the WAN.

13. The invention of claim 11, wherein the FC interface communicates the corresponding congestion information to the WAN interface via the converter.

14. The invention of claim 11, wherein the FC interface does not communicate any congestion information to the flow-control manager.

15. The invention of claim 11, wherein the flow-control manager does not communicate directly with the FC interface regarding the withholding of buffer credits for the FC network.

16. The invention of claim 11, wherein the flow control manager does not control the rate at which the converter converts IP/WAN data into FC data.

17. The invention of claim 11, wherein the flow control manager decreases the rate at which the converter converts FC data into IP/WAN data by increasing a parameter corresponding to a time interval between IP/WAN data packet conversions.

18. The invention of claim 11, wherein:
   the FC interface does not communicate any congestion information to the flow-control manager;
   the flow-control manager does not communicate directly with the FC interface regarding the withholding of buffer credits for the FC network;
   the flow control manager does not control the rate at which the converter converts IP/WAN data into FC data;
   the flow control manager decreases the rate at which the converter converts FC data into IP/WAN data by increasing a parameter corresponding to a time interval between IP/WAN data packet conversions; and
   the FC interface communicates the corresponding congestion information to the WAN interface via the converter.

* * * * *